Aug. 11, 1936.　　　H. G. DAVIS　　　2,050,424

MIDDLE BUSTER ATTACHMENT

Filed Dec. 7, 1934

*Henry G. Davis*
　　　　INVENTOR.

BY *J. Vincent Martin and
John W. Poteet, Jr.*
　　　　ATTORNEYS

Patented Aug. 11, 1936

2,050,424

UNITED STATES PATENT OFFICE 2,050,424

MIDDLE BUSTER ATTACHMENT

Henry G. Davis, Corpus Christi, Tex.

Application December 7, 1934, Serial No. 756,418

17 Claims. (Cl. 97—47)

This invention relates to agricultural devices, and more particularly to attachments for row-type tractors and more especially to that group of devices used in plowing and listing known as middle busters.

Among the objects of this invention may be enumerated the desire to attain greater flexibility and adjustability of the earth-working elements of the tractor, the attainment of a more direct transmission of power from the tractor unit to the earth-working implements, a full floating suspension of the middle buster with respect to the tractor vehicle, a pushing of the middle buster in contradistinction to a pulling, a greater flexibility in steering of the tractor, accurate adjustment of the parts from the operator's seat while the tractor is in operation, and other improved features and arrangements.

In the usual lister construction the plows or middle busters are attached to the front end and to the frame and cannot be regulated while the tractor is in motion. The plow is set to a certain depth before the tractor is put in motion and cannot be controlled while the tractor is moving. The tractor must be stopped to make an adjustment if the character of the land changes, requiring a readjustment of the depth of the plow or buster. Yet further, this manner of operating the device is such as to place a heavy load upon the forward wheels of the tractor, adding very greatly to the steering difficulties. Also in these constructions the lister or plow is generally located at one side of the vehicle.

The foregoing disadvantages have been overcome. The desirable objects enumerated, as well as others not specifically mentioned, have been attained by the apparatus hereinafter described.

Figure 1:
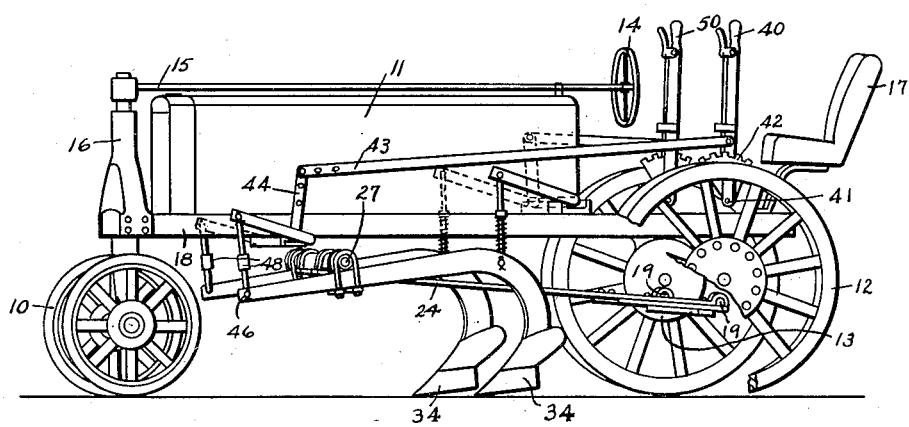
Figure 2:
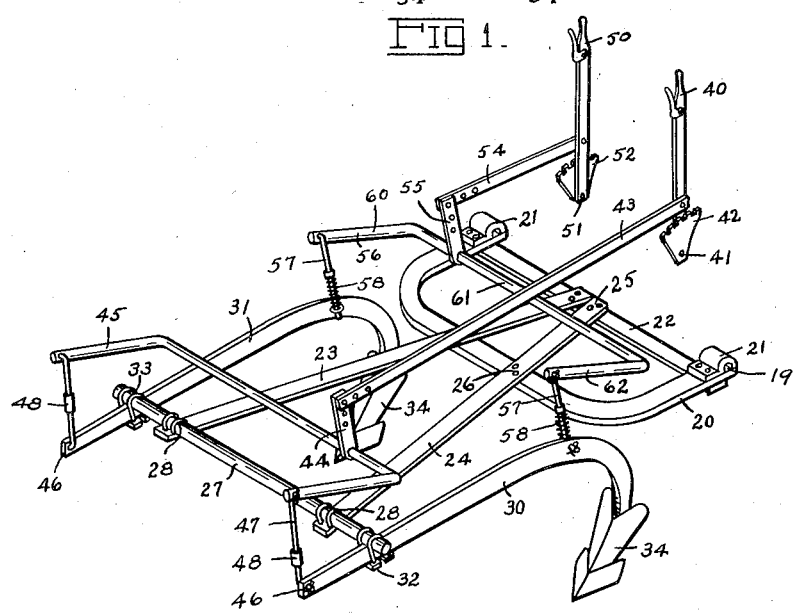

Fig. 1 is a three-quarter side elevation of the device applied to a tractor, the parts being broken away; and Fig. 2 is a perspective of the apparatus separated from the tractor.

Considering the drawing in more detail, the invention is shown in Fig. 1 as applied to a tractor of well known type operated from rear driving wheels. Means are provided whereby a direct connection is obtained from a point substantially adjacent the rear driving wheel axis whereby the middle busters are pushed with respect to the vehicle instead of being pulled. Suitable other means are shown for adjusting both the angle and depth of the cut from the operator's position on the tractor.

The tractor comprises a forward or steering set of wheels 10, an engine 11, and a set of rear driving wheels 12. The engine is connected to the rear wheels by suitable transmission and universal joints, the final drive to the wheels being by means of a gear train in the gear housing 13. The front wheels are steered by a steering wheel 14 having suitable connections 15 and 16 to the vertical axis of the forward wheels. The various elements of the control equipment are positioned adjacent the driver's or operator's seat 17. The engine 11 is mounted upon a suitable frame 18 which retains the various parts of the tractor in a predetermined relation.

The parts of the present improvement are pivotally supported from the rear housings 13 by pins or other means 19 to which a drawbar 20 is connected at points 21. In the particular embodiment illustrated, the drawbar comprises a U-shaped member 20 having a cross piece 22. Push bars 23 and 24 forming substantially a V-shaped member are connected centrally at the point 25 to the cross piece of the drawbar, and are fastened at points 26 to the U-shaped portion of the drawbar. Although it is preferable to have these push bars secured at a common point, under certain circumstances it may be advantageous to have them secured at spaced points instead of at the common point 25. However, if they are spaced too great a distance, the advantages of the V construction will be lost, and the device will then approximate certain disadvantages of prior art constructions. At the forward or outer extremity of the push bars 23 a beam anchor bar 27 is secured. This bar may be fastened by a plurality of U-bolts 28, or by any other appropriate means. Upon the anchor bar and adjacent the extremities thereof are pivotally mounted plow or lister beams 30 and 31 by appropriate and suitable means at the points 32 and 33. By the construction so far illustrated it is readily apparent that the anchor bar 27 swings along an arc having a radius or pivot point about the axes of the rear wheels, or substantially adjacent thereto at the points 19 on the rear wheel housings. This clearly illustrates the direct transmission of forces or energy from the tractor frame through the rear pivots 19 to the anchor bar and thence to the middle buster bottoms 34. As a result of this arrangement it is readily apparent that steering of the tractor is facilitated because pulling loads are not applied to the forward wheels. The bottoms 34 operate due to a pushing from the rear part of the tractor mechanism.

For the purpose of controlling both the depth and angle of the bottoms or middle busters 34, adjustable and control features are included. For controlling the angle of the bottoms or busters a control mechanism 40 is positioned adjacent the operator's seat on the tractor. This comprises a lever pivoted at the point 41 and associated with a hand-releasable ratchet 42 by means of which the lever may be moved and retained in adjusted position. A bar or rod 43 connects this lever with a bell crank or lever 44 which latter pivots about a fixed point on the frame. The lever is secured by suitable means to a yoke 45 which is arranged to rock about the frame due to movement of the control lever 40. Adjustment or setting of the various parts is obtained by a plurality of openings in both the rod 43 and crank 44 to allow variations in leverage and positionment of the parts. The yoke 45 is connected to the forward ends 46 of the plow or lister beams 30 and 31. This connection is by means of a bolt or tie rod 47 having a turn-buckle or other adjustable means 48 between the point 46 and the arm of the yoke. In this manner an independent adjustment of each beam with respect to the vehicle may be obtained, and a changing of the angle of the bottoms 34 may be accomplished simultaneously by a single movement of the lever 40. A raising and lowering for purposes of controlling the depth or cut of the bottoms is accomplished by a lever 50 operating in similar fashion at the opposite side of the vehicle. This lever is pivoted at 51 and retained in adjusted position by a ratchet 52. An adjustable bar 54 connects the lever to a crank 55, the latter being connected to a yoke 56 similar in construction to that at the forward end of the vehicle. This yoke 56 is pivotally connected to the frame of the vehicle and is connected to the beams by a link 57, the latter of which carries a spring 58 to absorb any shocks should the plow bottoms come into contact with an obstruction in their passage along the ground.

It is now quite apparent from the foregoing descriptions that I have illustrated and described a preferred embodiment of my invention which allows a great flexibility of control from the operator's seat while the self-propelled vehicle is in motion. Additional adjustability is provided for purposes of equalization of loading and depth of cut independently of the control from the operator's position. A further variation of my device may be accomplished by splitting the rear yoke 56, or by severing its functions into two parts, utilizing the lever 50 and the crank 55 and the portion of the yoke 60 as a bell crank and providing an additional lever adjacent to the one 50 and connected to the parts 61 and 62 of the yoke. By this latter means the rear ends of the beams may be raised and lowered independently of each other, whereas the angle of cut is controlled collectively. Other features of my invention will appear from the foregoing specification, and I aim to cover modifications within the true spirit and scope of the same by the hereto appended claims:

I claim:

1. A middle buster attachment for tractors having rear driving wheels and a frame comprising in combination a draw bar pivotally connected to the rear wheel housings adjacent the axis of the wheels, a plurality of push bars secured to the draw bar and extending forwardly thereof, a beam anchor bar adjacent the forward end of and secured to said push bars, middle buster beams pivotally secured to said bar, means secured to the tractor frame and adjustably connected to the forward end of the beams and arranged to be operated from the rear of the tractor, and means controllable from the rear of the tractor and secured to the beam to adjustably raise and lower the rear of the beams.

2. In a self propelled tractor of the type driving through the rear wheels the combination of a middle buster attachment comprising a draw bar pivotally connected to the rear of the tractor unit adjacent the axis of the driving wheels, an anchor bar adjacent the forward end of the tractor, a pair of beams carrying middle busters pivotally connected to said anchor bar at either side of the tractor, means connecting said anchor bar and said draw bar, means adjustably supporting the rear end of said beams from the tractor and means interconnecting the forward end of said beams and the tractor and arranged to regulate the angle of the middle buster with respect to the ground.

3. In a self propelled tractor of the type driving through the rear wheels the combination of a middle buster attachment comprising a draw bar pivotally connected to the rear of the tractor unit adjacent the axis of the driving wheels, an anchor bar adjacent the forward end of the tractor, a pair of beams carrying middle busters pivotally connected to said anchor bar at either side of the tractor, means connecting said anchor bar and said draw bar, means adjustably supporting the rear end of said beams from the tractor and means interconnecting the forward end of said beams and the tractor and arranged to regulate the angle of the middle buster with respect to the ground, said last named means being controllable from the rear of the tractor.

4. A middle buster type plow attachment for tractor type vehicles having driving wheels comprising in combination an anchor bar and means pivotally supporting said bar from substantially the axis of the driving wheels, plow beams pivotally secured to said bar at each side of the vehicle, means secured to the tractor frame and adjustably connected to the forward end of each of said beams, and arranged to be operated from the rear of the vehicle to control the angle of the plow with respect to the ground and means controllable from the rear of the tractor and connected to the beams to individually adjustably raise and lower the rear of the beam.

5. A middle buster type plow attachment for tractor type vehicles having driving wheels comprising in combination an anchor bar and means pivotally supporting said bar from substantially the axis of the driving wheels and forwardly thereof, plow beams pivotally secured to said bar at each side of the vehicle, means secured to the tractor frame and adjustably connected to the forward end of each of said beams, and arranged to be operated from the rear of the vehicle to control the angle of the plow with respect to the ground and means controllable from the rear of the tractor and connected to the beams to individually adjustably raise and lower the rear of the beam.

6. A middle buster attachment for self-propelled vehicles having rear driving wheels comprising in combination a draw bar pivotally connected to the vehicle adjacent the axis of the driving wheel, a V push bar secured to the draw bar and extending forwardly thereof, an anchor bar adjacent the open end of and secured to said push bar, beams having middle busters pivotally secured to said bar, means secured to the vehicle frame and adjustably connected to the forward end of the beams and arranged to be operated from the rear of the vehicle and means controllable from the rear of the vehicle and secured to the beam and arranged to adjustably raise and lower the rear of the beam.

7. In a self-propelled vehicle of the tractor type having rear driving wheels, an attachment having a plurality of middle buster bottoms comprising a frame pivotally supported adjacent the driving wheels, beams having a middle buster bottom thereon pivoted at points remote from their ends to said frame at each side of the vehicle, and means controllable from the operator's seat arranged to control the pivoting movement of the beams.

8. In a tractor having a frame and rear driven wheels the combination of a middle buster attachment comprising a V-frame, beams carrying middle busters pivotally connected at each side of said V-frame, said V-frame connected to the rear of the tractor frame and arranged to pivot about an axis extending transversely of the tractor, the forward end of said V-frame being free to float with respect to the forward part of the tractor and arranged to drive the middle busters by a pushing action, and means controllably limiting the floating movement of the V-frame.

9. In a tractor having a frame and rear driven wheels the combination of a middle buster attachment comprising a V-frame, beams carrying middle busters pivotally connected at each side of said V-frame, said V-frame connected to the rear of the tractor frame and arranged to pivot about an axis extending transversely of the tractor, the forward end of said V-frame being free to float with respect to the forward part of the tractor, means adjustably limiting said floating action, and means independent of said last named means arranged to raise and lower the middle busters.

10. A middle buster attachment for tractors having rear driving wheels comprising in combination a draw bar pivotally connected to the rear of the tractor adjacent the axis of the driving wheels, push bars connected to the draw bar and extending forwardly thereof, an anchor bar adjacent the forward end of and secured to said push bars, beams pivotally secured to said bars, and means secured to the tractor frame and adjustably connected to the forward end of the beams, and arranged to be operated from the rear of the tractor to adjust the vertical angle between the middle buster and the ground by means of a raising and lowering of the forward end of the beam.

11. In a tractor the combination of a middle buster attachment comprising means pivotally connected to the rear of the tractor and arranged to push the middle busters therefrom, means on the tractor including resilient means to raise and lower the middle busters controllably from the operator's seat, and means controllable from the operator's seat to adjust the angle of the cutting edge of the middle busters with respect to the ground by raising and lowering the forward end of the middle buster attachment.

12. In a self-propelled vehicle of the tractor type having rear driving wheels, an attachment having a plurality of middle buster bottoms comprising a frame pivotally supported adjacent the driving wheels, beams having a middle buster bottom thereon pivoted to said frame at each side of the vehicle and positioned ahead of the driving wheels, the front end of said frame being free to float with respect to the vehicle and means on the vehicle controllable from the operator's seat arranged to control the pivoted movement of the beams.

13. A middle buster attachment for tractors having rear driving wheels comprising in combination a draw bar pivotally connected to the rear of the tractor adjacent the axis of the driving wheels, push bars connected to the draw bar and extending forwardly thereof, an anchor bar adjacent the forward end of and secured to said push bars, beams pivotally secured to said bars, and means independent of the draw bar secured to the tractor frame and adjustably connected to the forward end of the beams, arranged to be operated from the rear of the tractor to adjust the vertical angle between the middle buster and the ground by means of a raising and lowering of the forward end of the beam.

14. In a self-propelled vehicle of the tractor type having a pair of middle buster bottoms, the combination of an attachment comprising means supporting the bottoms on the vehicle for both vertical movement and angular movement with respect thereto, means on the vehicle for simultaneously adjusting the angle of both bottoms with respect to the ground, and means on the vehicle for adjusting the elevation of said bottoms, said angle and elevation adjusting means being connected with said bottoms forwardly of the connection between said supporting means and the vehicle.

15. In a tractor having a frame and rear driven wheels, the combination of a middle buster attachment comprising a substantially rigid frame, beams carrying middle busters pivotally connected at each side of said rigid frame, said rigid frame being connected to the rear of the tractor frame and arranged to pivot about an axis extending transversely of the tractor, the forward end of said rigid frame being free to float with respect to the forward part of the tractor, and means adjustably limiting said floating action.

16. In a tractor having a frame and rear driven wheels, the combination of a middle buster attachment comprising a substantially rigid frame wider at its ends than intermediate its ends, and beams carrying middle busters pivotally connected at each side of said rigid frame, said rigid frame being connected to the rear of the tractor frame and arranged to pivot about an axis extending transversely of the tractor, said busters being positioned on opposite sides of and adjacent the narrower part of said frame.

17. In a self-propelled vehicle of the tractor type having a pair of middle buster bottoms, the combination of an attachment comprising means supporting the bottoms on the vehicle for both vertical movement and angular movement with respect thereto, means on the vehicle for simultaneously adjusting the angle of both bottoms with respect to the ground, and means on the vehicle for adjusting the elevation of said bottoms, said last means comprising parts for positively limiting downward movement and parts for resiliently limiting upward movement of said bottoms for a given adjustment.

HENRY G. DAVIS.